US007676365B2

(12) United States Patent
Hwang et al.

(10) Patent No.: US 7,676,365 B2
(45) Date of Patent: Mar. 9, 2010

(54) METHOD AND APPARATUS FOR CONSTRUCTING AND USING SYLLABLE-LIKE UNIT LANGUAGE MODELS

(75) Inventors: Mei-Yuh Hwang, Sammamish, WA (US); Fileno A. Alleva, Redmond, WA (US); Rebecca C. Weiss, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 11/110,602

(22) Filed: Apr. 20, 2005

(65) Prior Publication Data

US 2005/0187769 A1 Aug. 25, 2005

Related U.S. Application Data

(62) Division of application No. 09/748,453, filed on Dec. 26, 2000, now Pat. No. 6,973,427.

(51) Int. Cl.
*G10L 15/06* (2006.01)
(52) U.S. Cl. ........................ 704/240; 704/243
(58) Field of Classification Search ................... 704/10, 704/243, 240
See application file for complete search history.

(56) References Cited

U.S. PATENT DOCUMENTS

| 5,502,791 | A |   | 3/1996  | Nishimura et al. ........... 704/256 |
|-----------|---|---|---------|--------------------------------------|
| 5,835,888 | A | * | 11/1998 | Kanevsky et al. ............... 704/9 |
| 5,865,626 | A |   | 2/1999  | Beattie et al. ................ 704/240 |
| 5,873,061 | A |   | 2/1999  | Hab-Umbach et al. ....... 704/254 |
| 5,875,426 | A |   | 2/1999  | Bahl et al. .................... 704/255 |
| 5,949,961 | A | * | 9/1999  | Sharman ...................... 704/260 |
| 6,009,392 | A |   | 12/1999 | Kanevsky et al. ............ 704/245 |
| 6,067,520 | A |   | 5/2000  | Lee .............................. 704/270 |
| 6,167,369 | A | * | 12/2000 | Schulze ........................... 704/9 |
| 6,208,964 | B1 |  | 3/2001  | Sabourin ...................... 704/244 |
| 6,233,553 | B1 |  | 5/2001  | Contolini et al. ............. 704/220 |
| 6,243,680 | B1 |  | 6/2001  | Gupta et al. .................. 704/260 |
| 6,363,342 | B2 |  | 3/2002  | Shaw et al. ................... 704/220 |
| 6,377,921 | B1 |  | 4/2002  | Bahl et al. .................... 704/243 |
| 6,408,271 | B1 |  | 6/2002  | Smith et al. .................. 704/257 |

(Continued)

FOREIGN PATENT DOCUMENTS

JP        11-352994         12/1999

OTHER PUBLICATIONS

"Phonetic Labeling of Speech Frames to Help Lip-Reading," IBM-Technical Disclosure Bullentin, Sep. 1, 1994, vol. 37, Issue 9, p. 681-682.*

(Continued)

*Primary Examiner*—Angela A Armstrong
(74) *Attorney, Agent, or Firm*—Theodore M. Magee; Westerman, Champlin & Kelly, P.A.

(57) ABSTRACT

A method and computer-readable medium use syllable-like units (SLUs) to decode a pronunciation into a phonetic description. The syllable-like units are generally larger than a single phoneme but smaller than a word. The present invention provides a means for defining these syllable-like units and for generating a language model based on these syllable-like units that can be used in the decoding process. As SLUs are longer than phonemes, they contain more acoustic contextual clues and better lexical constraints for speech recognition. Thus, the phoneme accuracy produced from SLU recognition is much better than all-phone sequence recognition.

5 Claims, 7 Drawing Sheets

U.S. PATENT DOCUMENTS

| | | | |
|---|---|---|---|
| 6,487,532 | B1 | 11/2002 | Schoofs et al. .............. 704/251 |
| 2002/0082831 | A1 | 6/2002 | Hwang et al. ............... 704/249 |
| 2002/0173945 | A1 | 11/2002 | Fabiani et al. .................. 704/1 |

OTHER PUBLICATIONS

IBM® (IBM Technical Disclosure Bulletin NN87013641, Jan. 1987) Procedure for Using Contextual Information To Obtain Improved Estimates of Word Probabilities In A Speech Recognition System.

S.R. Young et al., "Learning New Words From Spontaneous Speech," Proceedings of ICASSP '93, IEEE, vol. 2, pp. 590-591 (Apr. 27-30, 1993).

T. Slobada, "Dictionary Learning: Performance Through Consistency," 1995 International Conference on Acoustics, Speech, and Signal Processing, IEEE, Part vol. 1, pp. 453-456 (May 9-12, 1995).

N. Cremelie et al., "In Search of Better Pronunciation Models For Speech Recognition," *Speech Communication*, vol. 29, No. 2-4, pp. 115-136 (Nov. 1999).

All Office Actions (Mar. 7, 2003; Jul. 15, 2003; Dec. 9, 2003; May 4, 2004) and Responses (Jun. 5, 2003; Sep. 25, 2003; Apr. 9, 2004; Jul. 6, 2004; Aug. 25, 2004; Nov. 4, 2004) for U.S. Appl. No. 09/748,453, filed Dec. 26, 2000.

Kimura ("100000-Word Recognition Using Acoustic-Segment Networks," International Conference on Acoustics, Speech and Signal Processing, Apr. 1990).

Eichner et al. ("Data-Driven Generation of Pronunciation Dictionaries In the German Verbmobil Project: Discussion of Experimental Results," International Conference on Acoustics, Speech and Signal Processing, Jun. 2000).

S. Nakagawa et al., "An Isolated Spoken Word Recognition System With Capability of Registration of New Words," *Transactions of the Institute of Electrical Engineers of Japan*, Part C, vol. 118-C, No. 6, pp. 865-872 (Jun. 1998).

T. Slobada et al. "Dictionary Learning for Spontaneous Speech Recognition," Proceedings ISCLP 96. Fourth International Conference on Spoken Language Processing, IEEE, Part vol. 4, pp. 2328-2331, (Oct. 3-6, 1996).

A. Berton et al. "Compound Words in Large-Vocabulary German Speech Recognition Systems," Proceedings ICSLP 96. Fourth International Conference on Spoken Language Processing, IEEE, Part vol. 2, pp. 1165-1168 (Oct. 3-6, 1996).

A. Giordana et al., "Use of Lexical Constraints in Continuous Speech Understanding," 1983 Proceedings of the International Conference on Systems, Man and Cybernetics, IEEE, vol. 1, pp. 319-322 (Dec. 29, 1983-Jan. 7, 1984).

M. Brenner et al., "Word Recognition in Continuous Speech Using a Phonological Based Two-Network Matching Parser and A Synthesis Based Prediction," ICASSP-89: 1989 International Conference on Acoustics, Speech and Signal Processing, IEEE, vol. 1, pp. 457-460 (May 23-26, 1989).

P. Jacobs et al., "Acquiring Lexical Knowledge From Text: A Case Study," AAAI 88. Seventh National Conference on Artificial Intelligence, vol. 2, pp. 739-744 (Aug. 21-26, 1988).

\* cited by examiner

METHOD AND APPARATUS FOR CONSTRUCTING AND USING SYLLABLE-LIKE UNIT LANGUAGE MODELS

REFERENCE TO RELATED APPLICATIONS

This application is a divisional of and claims priority from U.S. patent application Ser. No. 09/748,453, filed on Dec. 26, 2000 and entitled "METHOD FOR ADDING PHONETIC DESCRIPTIONS TO A SPEECH RECOGNITION LEXICON".

BACKGROUND OF THE INVENTION

The present invention relates to speech recognition. In particular, the present invention relates to adding phonetic descriptions of words to the lexicon of a speech recognition system.

In speech recognition, human speech is converted into text. To perform this conversion, the speech recognition system identifies a most-likely sequence of acoustic units that could have produced the speech signal. To reduce the number of computations that must be performed, most systems limit this search to sequences of acoustic units that represent words in the language of interest.

The mapping between sequences of acoustic units and words is stored in a lexicon (sometimes referred to as a dictionary). Regardless of the size of the lexicon, some words in the speech signal will be outside of the lexicon. These out-of-vocabulary (OOV) words cannot be recognized by the speech recognition system because the system does not know they exist. Instead, the recognition system is forced to recognize other words in place of the out-of-vocabulary word, resulting in recognition errors.

In the past, some speech recognition systems have provided a way for users to add words to the speech recognition lexicon. In order to add a word to a lexicon, the text of the word and a phonetic or acoustic description of its pronunciation must be provided to the speech recognition system, in addition to its likelihood in contexts (or so called language model).

Under some prior art systems, the pronunciation of a word is provided by a letter-to-speech (LTS) system that converts the letters of the word into phonetic symbols describing its pronunciation. The conversion from letters to phonetic symbols is performed based on rules associated with the particular language of interest.

Such LTS systems are only as good as the rules provided to the system. In most LTS systems, these rules fail to properly pronounce entire classes of words, including foreign originating words and complex acronyms. If the LTS rules fail to properly identify the pronunciation for a word, the speech recognition system will not be able to detect the word when later spoken by the user.

In other systems, the pronunciation of a word is provided by recording the user as they pronounce the word. This recorded signal is then used as a template for the word. During recognition, the user's speech signal is compared against the template speech signal directly and if they are sufficiently similar, the new word is recognized.

Note that a template system requires a significant amount of storage for each new template. This is because the template must store the speech signal itself instead of a phonetic description of the speech signal. This not only requires more storage space but also requires a modified recognition process because most recognition systems utilize the phonetic description of words when performing speech recognition.

A third possibility is closely related to out-of-vocabulary detection. Some systems use a network of any phoneme followed by any other phoneme to recognize a new word, which may be composed of any sequence of phonemes. Usually a phoneme bigram or trigram is used in the search process to help the performances both in accuracy and speed. However, phoneme sequence recognition, even with bigram or trigram, is well known to be difficult. The phoneme accuracy is usually low.

Thus, a system is needed for adding words to a speech recognition lexicon that provides a sequence of phonetic units for each added word while improving the identification of those phonetic units.

SUMMARY OF THE INVENTION

A method and computer-readable medium use syllable-like units (SLUs) to decode a pronunciation into a phonetic description. The syllable-like units are generally larger than a single phoneme but smaller than a word. The present invention provides a means for defining these syllable-like units and for generating a language model based on these syllable-like units that can be used in the decoding process. As SLUs are longer than phonemes, they contain more acoustic contextual clues and better lexical constraints for speech recognition. Thus, the phoneme accuracy produced from SLU recognition is much better than all-phone sequence recognition.

DETAILED DESCRIPTION OF ILLUSTRATIVE EMBODIMENTS

Figure 1:
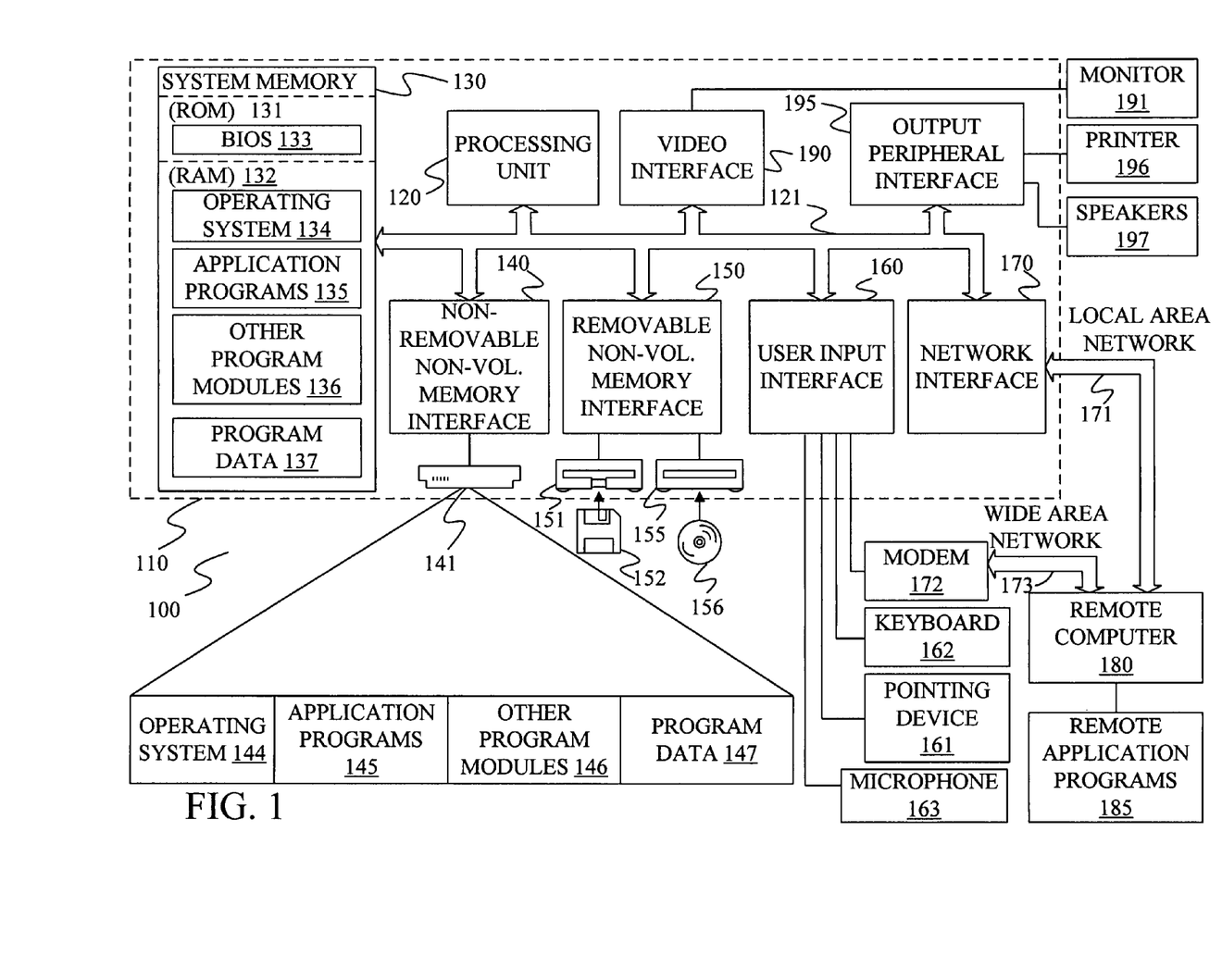
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
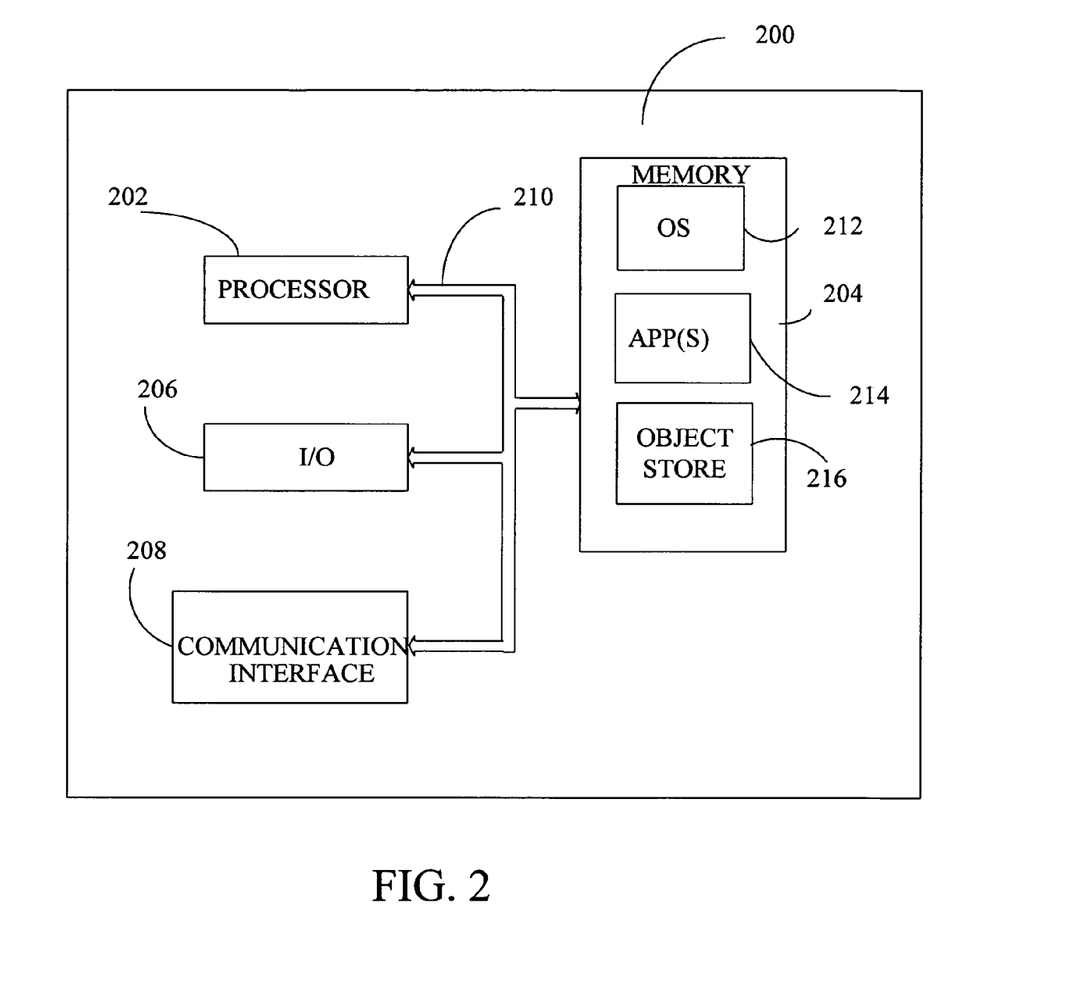
FIG. 2 is a block diagram of a general mobile computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
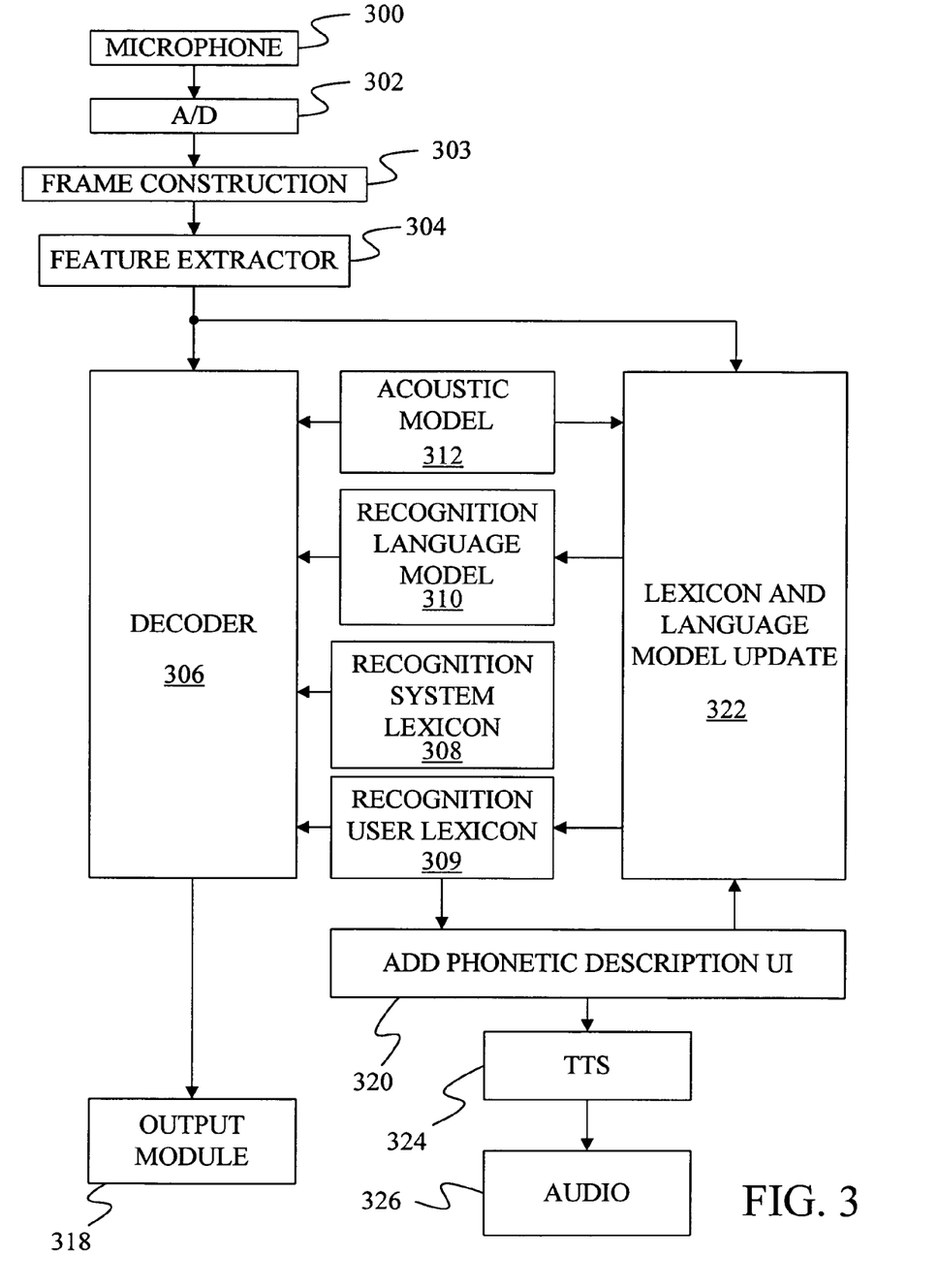
FIG. 3 is a block diagram of a speech recognition system under the present invention.

FIG. 3 provides a more detailed block diagram of speech recognition modules that are particularly relevant to the present invention. In FIG. 3, an input speech signal is converted into an electrical signal, if necessary, by a microphone 300. The electrical signal is then converted into a series of digital values by an analog-to-digital converter 302. In several embodiments, A-to-D converter 302 samples the analog signal at 16 kHz and 16 bits per sample thereby creating 32 kilobytes of speech data per second.

The digital data is provided to a frame construction unit 303, which groups the digital values into frames of values. In one embodiment, each frame is 25 milliseconds long and begins 10 milliseconds after the beginning of the previous frame.

The frames of digital data are provided to a feature extractor 304, which extracts a feature from the digital signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a single multi-dimensional feature vector per frame. The number of dimensions or values in the feature vector is dependent upon the type of feature extraction that is used. For example, mel-frequency cepstrum coefficient vectors generally have 12 coefficients plus a coefficient representing power for a total of 13 dimensions. In one embodiment, a feature vector is computed from the mel-coefficients by taking the first and second derivative of the mel-frequency coefficients plus power with respect to time. Thus, for such feature vectors, each frame is associated with 39 values that form the feature vector.

During speech recognition, the stream of feature vectors produced by feature extractor 304 is provided to a decoder 306, which identifies a most likely sequence of words based on the stream of feature vectors, a recognition system lexicon 308, a recognition user lexicon 309, a recognition language model 310, and an acoustic model 312.

In most embodiments, acoustic model 312 is a Hidden Markov Model consisting of a set of hidden states, with one state per frame of the input signal. Each state has an associated set of probability distributions that describe the likelihood of an input feature vector matching a particular state. In some embodiments, a mixture of probabilities (typically 10 Gaussian probabilities) is associated with each state. The model also includes probabilities for transitioning between two neighboring model states as well as allowed transitions between states for particular linguistic units. The size of the linguistic units can be different for different embodiments of the present invention. For example, the linguistic units may be senones, phonemes, diphones, triphones, syllables, or even whole words.

System lexicon 308 consists of a list of linguistic units (typically words or syllables) that are valid for a particular language. Decoder 306 uses system lexicon 308 to limit its search for possible linguistic units to those that are actually part of the language. The system lexicon also contains pronunciation information (i.e. mappings from each linguistic unit to a sequence of acoustic units used by the acoustic model).

User lexicon 309 is similar to system lexicon 308, except user lexicon 309 contains linguistic units that have been added by the user and system lexicon 308 contains linguistic units that were provided with the speech recognition system. Under the present invention, a method and apparatus are provided for adding new linguistic units to user lexicon 309.

Language model 310 provides a set of likelihoods that a particular sequence of linguistic units will appear in a particular language. In many embodiments, the language model is based on a text database such as the North American Business News (NAB), which is described in greater detail in a publication entitled CSR-III Text Language Model, University of Penn., 1994. The language model may be a context-free grammar, a statistical N-gram model such as a trigram, or a combination of both. In one embodiment, the language model is a compact trigram model that determines the probability of a sequence of words based on the combined probabilities of three-word segments of the sequence.

Based on the acoustic model, the language model, and the lexicons, decoder 306 identifies a most likely sequence of linguistic units from all possible linguistic unit sequences. This sequence of linguistic units represents a transcript of the speech signal.

The transcript is provided to an output model 318, which handles the overhead associated with transmitting the transcript to one or more applications. In one embodiment, output module 318 communicates with a middle layer that exists between the speech recognition engine of FIG. 3 and one or more applications.

Under the present invention, new words can be added to user lexicon 309 and language model 310 by entering the text of the word in a user interface 320 and pronouncing the word into microphone 300. The pronounced word is converted into feature vectors by analog-to-digital converter 302, frame construction 303 and feature extractor 304. During the process of adding a word, these feature vectors are provided to a lexicon-and-language-model update unit 322 instead of decoder 306.

Update unit 322 also receives the text of the new word from user interface 320. Based on the feature vectors and the text of the new word, update unit 322 updates language model 310 and user lexicon 309 through a process described further below.

Figure 4:
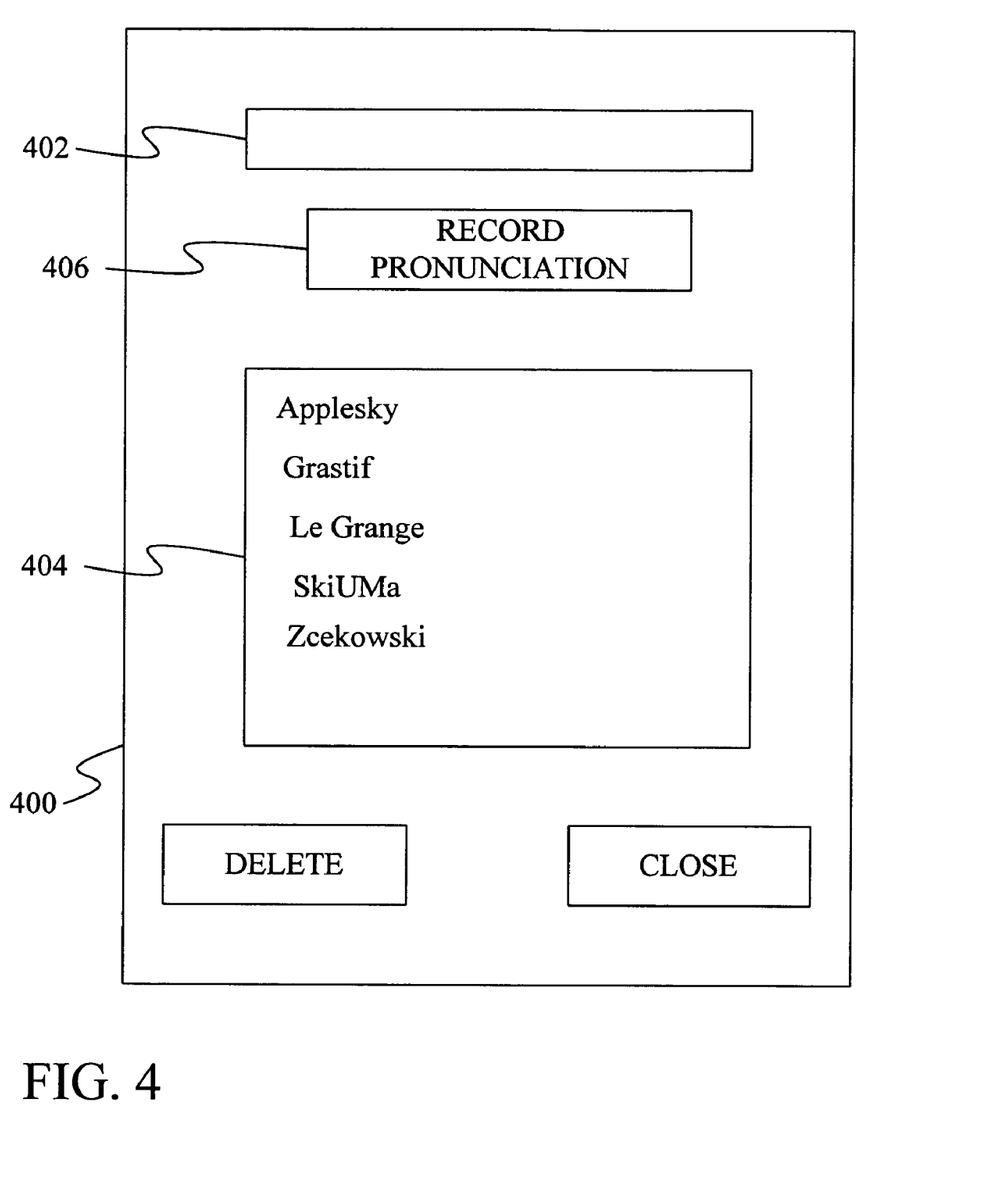
FIG. 4 is an image of a user interface for adding words to a speech recognition lexicon under one embodiment of the present invention.

FIG. 4 provides one embodiment of a window 400 displayed by user interface 320 to allow a user to add a word to the user lexicon. In FIG. 4, the user enters new words by entering letters in an edit box 402. As the user enters letters, an alphabetical list 404 that contains words for which pronunciations have been previously added scrolls so that the top entry in the list is alphabetically after the letters in edit box 402.

After the user has entered the entire word in edit box 402, the user clicks on or selects button 406, which activates microphone 300 for recording. The user then pronounces the new word. When silence is detected in the speech signal, microphone 300 is deactivated and the pronunciation and text of the word are used to form a phonetic description for the word.

After the phonetic description has been formed the word in edit box 402 is added to list 404 if it is not already present in list 404.

After the phonetic description has been added to user lexicon 309, the user can verify the pronunciation by selecting the word in list 404. Under one embodiment, when a user selects a word in list 404, user interface 320 retrieves the selected word's phonetic representation from user lexicon 309. User interface 320 then passes the phonetic representation to a text-to-speech engine 324, which converts the phonetic representation into an audio generation signal. This signal is then converted into an audible signal by a speaker 326.

Note that under embodiments of the present invention, the phonetic representation of the word is not a direct recording of the user's pronunciation. Instead, it is the individual acoustic units that form the pronunciation of the word. Because of this, text-to-speech engine 324 can apply any desired voice when generating the audio generation signal. Thus, if the user is male but text-to-speech engine 324 uses a female voice when generating speech, the new word will be pronounced by the system in a female voice.

Figure 5:
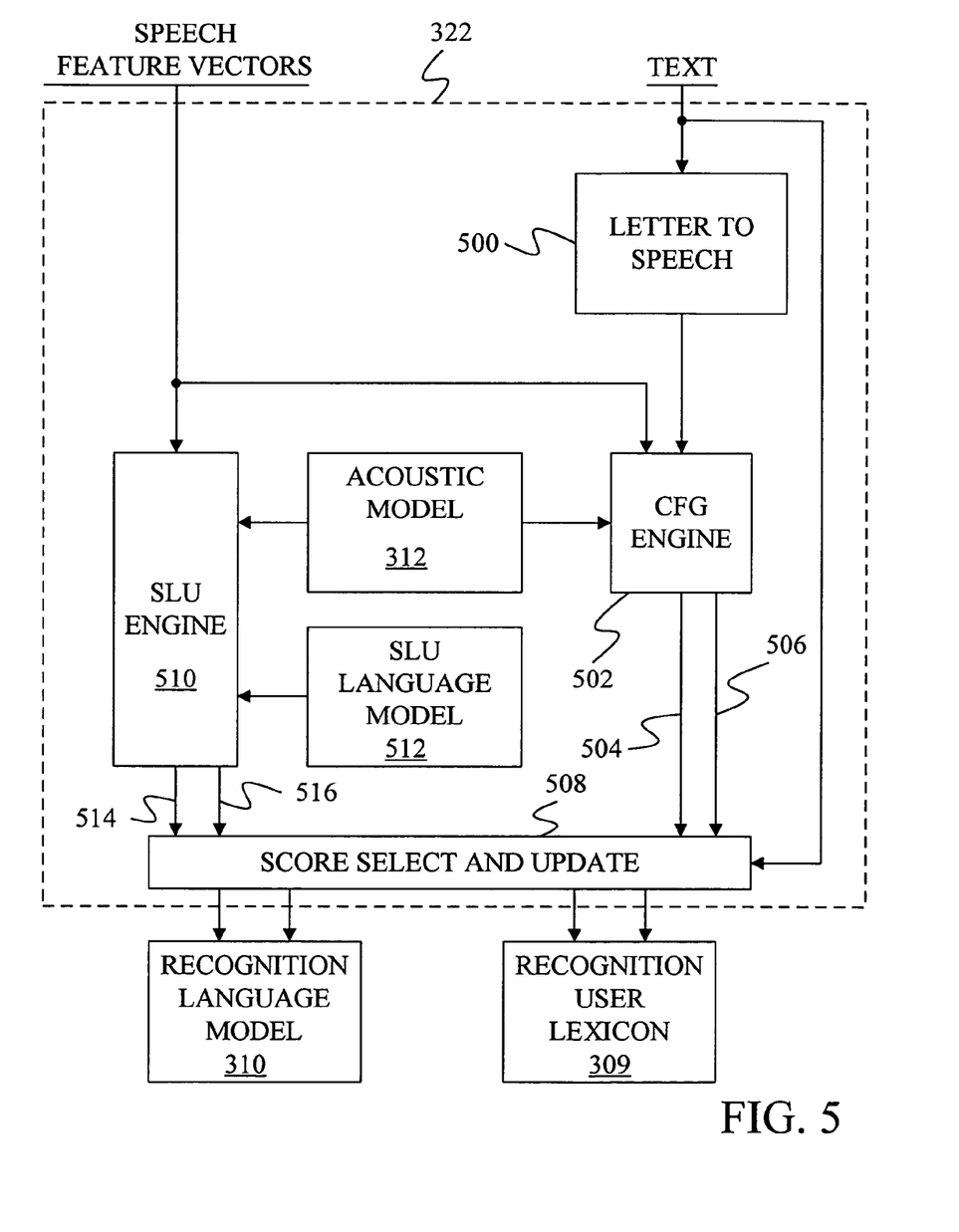
FIG. 5 is a block diagram of lexicon and language model update components of one embodiment of the present invention.
Figure 6:
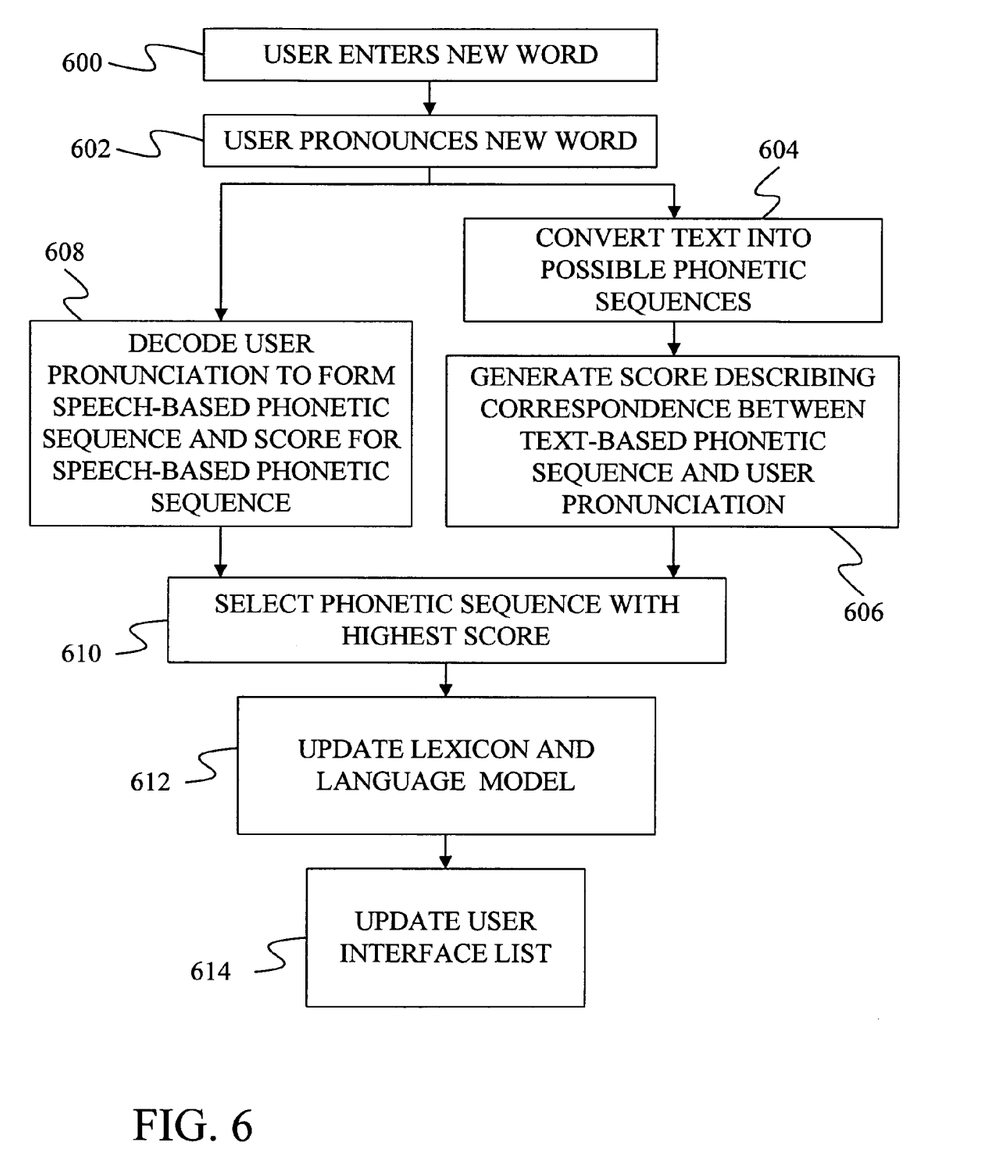
FIG. 6 is a flow diagram of a method of adding a word to a speech recognition lexicon under the present invention.

FIG. 5 provides a block diagram of the components in lexicon-and-language-model update unit 322 that are used to update recognition language model 310 and recognition user lexicon 309. FIG. 6 provides a flow diagram of a method implemented by the components of FIG. 5 for updating the language model and the user lexicon.

In step 600 of FIG. 6, the user enters a new word in the edit box and at step 602, the user pronounces the word as described above. The text from user interface 320 is provided to a letter-to-speech converter 500 in update unit 322.

At step 604 of FIG. 6, letter-to-speech unit 500 converts the text into one or more possible phonetic sequences. This conversion is performed by utilizing a collection of pronunciation rules that are appropriate for a particular language of interest. In most embodiments, the phonetic sequence is constructed of a series of phonemes. In other embodiments, the phonetic sequence is a sequence of triphones.

Under most embodiments, letter-to-speech unit 500 generates more than one phonetic sequence for the text. Each phonetic sequence represents a possible pronunciation for the text and is provided to a context-free grammar engine 502, which also receives the speech feature vectors that were generated when the user pronounced the new word.

At step 606 of FIG. 6, context-free grammar engine 502 scores each phonetic sequence from letter-to-speech unit 500 and outputs the phonetic sequence with the highest score. To generate the scores for the phonetic sequences, context-free grammar engine 502 compares the feature vectors produced by the user's pronunciation of the word with the model parameters stored in acoustic model 308 for each sequence's phonetic units. Using the model parameters, context-free grammar engine 502 determines the likelihood that the speech feature vectors correspond to each sequence of phonetic units. This scoring is similar to the scoring performed by decoder 306 during speech recognition.

Context-free grammar engine 502 also adds a language model score to the acoustic model score to determine a total score for each sequence of phonetic units. Under one embodiment, each sequence is given the same language model score, which is equal to one-half the inverse of the number of phonetic sequences scored by context-free grammar engine 502.

Context-free grammar engine 502 outputs the phonetic sequence with the highest score as phonetic sequence 504. Engine 502 also outputs the score of this sequence as total score 506. Score 506 and phonetic sequence 504 are provided to a score-select-and-update unit 508.

While letter-to-speech unit 500 and context-free grammar engine 502 are operating or immediately thereafter, a recognition engine 510 identifies a most likely sequence of syllable-like units that can be represented by the speech feature vectors at step 608. It then converts the sequence of syllable-like units into a sequence of phonetic units, which it provides at its output along with a score for the sequence of phonetic units.

Under the present invention, a syllable-like unit contains at least one phoneme associated with a vowel sound and one or more consonants. In general, a syllable-like unit is smaller than a word unit but larger than a single phoneme.

Each syllable-like unit is found in SLU language model 512, which in many embodiments is a trigram language model. Under one embodiment, each syllable-like unit in language model 512 is named such that the name describes all of the phonetic units that make up the syllable-like unit. Using this naming strategy, SLU engine 510 is able to identify the phonetic units associated with each syllable-like unit simply by examining the name associated with the syllable-like unit. For example, the syllable-like unit named EH_K_S, which is the first syllable in the word "exclamation", contains the phonemes EH, K and S.

During recognition, SLU engine 510 determines the correspondence between the speech feature vectors and all possible combinations of syllable-like units. In most embodiments, the recognition process is performed using a Viterbi search, which sequentially builds and scores hypothesized sequences of syllable-like units. Specifically, the search updates the score of each hypothesized sequence of units each time it adds a syllable-like unit to the sequence. In most embodiments, the search periodically prunes hypothesized sequences that have low scores.

SLU engine 510 updates the score for a hypothesized sequence of syllable-like units by adding the language model score and acoustic model score of the next syllable-like unit to the sequence score. SLU engine 510 calculates the language model score based on the model score stored in SLU language model 512 for the next syllable-like unit to be added to the hypothesized sequence. In one embodiment, SLU language model 512 is a trigram model, and the model score is based on the next syllable-like unit and the last two syllable-like units in the sequence of units.

SLU engine 510 generates the acoustic model score by retrieving the acoustic model parameters for the phonetic units that form the next syllable-like unit. These acoustic model parameters are then used to determine the correspondence between the speech feature vectors and the phonetic units. The acoustic model scores for each phonetic unit are added together to form an acoustic model score for the entire syllable-like unit.

The acoustic model score and the language model score are summed together to form a total score for the next syllable-like unit given the hypothesized sequence of units. This total score is then added to the total scores previously calculated for the hypothesized sequence to form a score for the updated hypothesized sequence that now includes the next syllable-like unit.

This process of building and pruning sequences of syllable-like units continues until the last speech feature vector is used to update the sequence scores. At that point, the sequence of syllable-like units that has the highest total score is dissected into its constituent phonemes by SLU engine 510. The sequence of phonemes and the score generated for the sequence of syllable-like units are then output as phoneme sequence 514 and score 516, which are provided to score-select-and-update unit 508.

Scores 516 and 506, which are provided by SLU engine 510 and CFG engine 502, respectively, include acoustic model scores that are formed from the same acoustic model parameters. In addition, SLU language model 512 provides a language model score that is comparable to the language model score attached to each of the phoneme sequences evaluated by context-free grammar engine 502. As such, total scores 516 and 506 can be meaningfully compared to each other.

In step 610 of FIG. 6, score-select-and-update unit 508 selects the phoneme sequence, either phoneme sequence 504 or sequence 514, that has the highest score. At step 612, score-select-and-update 508 then stores the phoneme sequence with the highest score in recognition user lexicon 309 together with the text of the word entered by the user. If the text of the word is already in user lexicon 309, the phoneme sequence is added as an additional alternative pronunciation for the text. Score-select-and-update unit 508 also updates recognition language model 310 by adding the text of the word to language model 310 if the word is new to the language model. Under one embodiment, the text is added to language model 310 with a fixed unigram probability that is the same for all words added through this process.

At step 614 of FIG. 6, the user interface adds the new text to list 404, so that the user may select the word to hear the pronunciation that the recognition engine has associated with the word. Note that because the present invention identifies a sequence of phonetic units for each new word, the speech signal generated by text-to-speech engine 324 provides an indication of the pronunciation understood by the recognition system. This is an improvement over prior art template systems, which could only replay the user's recording of the word without providing any indication that the system actually understood the acoustic content of the word.

Although the description above makes reference to using phonemes as the base phonetic unit in the phonetic description, in other embodiments, other phonetic units are used in the phonetic description such as diphones, triphones, or senones.

Note that the system described above uses two parallel techniques for identifying a possible phonetic sequence to represent the text. Along one path, the letter-to-speech system and CFG engine 502 identify one possible phonetic sequence using letter-to-speech rules. Along the other path, SLU engine 510 identifies a second phonetic sequence by recognizing a sequence of syllable-like units from the user's pronunciation of the word. By using such parallel methods, the present invention is able to overcome shortcomings in prior art letter-to-speech systems.

In particular, for words that do not meet the pronunciation rules set by letter-to-speech unit 500, SLU engine 510 will identify a phonetic sequence that has a higher score than the phonetic sequence identified by letter-to-speech unit 500. In fact, SLU engine 510 will identify a phonetic sequence that more closely matches the actual pronunciation provided by the user. In other cases, where the rules used by letter-to-speech unit 500 accurately describe the pronunciation of the word, the phonetic sequence generated by letter-to-speech unit 500 will be more accurate than the phonetic sequence generated by SLU engine 510. In those cases, the score generated for the sequence of phonetic units from letter-to-speech unit 500 will be higher than the score generated for the phonetic units identified by SLU engine 510.

The set of syllable-like units that is used by SLU engine 510 can be selected by hand or can be selected using a set of defining constraints. One embodiment of a method that selects the syllable-like units using a set of constraints is described in the flow diagram of FIG. 7.

Figure 7:
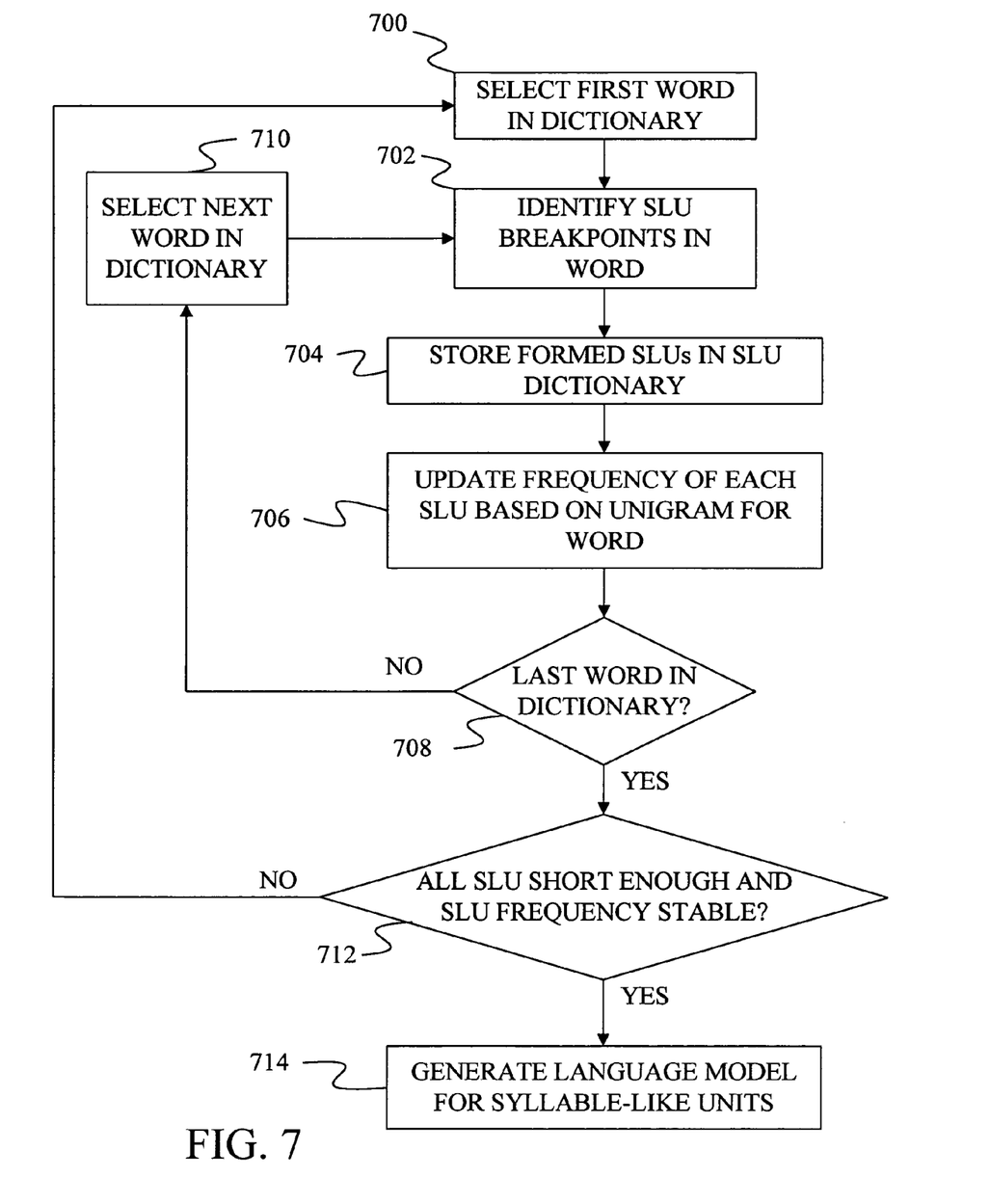
FIG. 7 is a flow diagram of a method of generating a syllable-like unit language model.

The method of FIG. 7 makes several passes through a dictionary that contains a large number of words and their phonetic descriptions. During each pass, potential syllable-like units are identified in each word by using a set of constraints that favor particular divisions of each word. Some of these constraints are based on the frequency of each potential syllable-like unit in the dictionary. Because the frequency of each potential syllable-like unit changes with each pass through the dictionary, the manner in which many of the words are divided changes with each pass through the dictionary.

This recursive procedure begins at step 700 of FIG. 7, where a first word is selected from the dictionary. Under one embodiment of the invention, a dictionary of 60,000 words is used. At step 702, the word is broken into individual syllable-like units.

To identify the possible syllable-like units in the word at step 702, a collection of constraints are used to identify a preferred division of the word. These constraints include having at most one vowel sound per syllable, and limiting syllable-like units to four phonemes or less. If a possible syllable-like unit has more than four phonemes, it is broken down into smaller syllable-like units. For example, the word "strength" contains a single syllable, but also contains six phonemes. As such, it would be divided into two syllable-like units under the present invention.

A third constraint for dividing a word into syllable-like units is that acoustic strings that are hard to recognize individually are kept together. For example, the phonemes "S", "T" and "R" are difficult to recognize individually, and therefore would be put together in a single syllable-like unit when dividing a word such as "strength".

A fourth constraint that can be used when dividing words into syllable-like units attempts to create a small set of common syllable-like units. Thus, when breaking a word, a syllable-like unit that appears more frequently in the dictionary is preferred over a syllable-like unit that is rare in the dictionary.

Initially, every word starts from the longest syllable units: each unit contains at most one vowel and extends as long as it can until it hits another vowel. In order to select syllable-like units based on the frequency constraint, the method of FIG. 7 provides an iterative approach in which each SLU identified in step 702 is added to a temporary SLU dictionary in step 704 if it is not already present in the dictionary and the frequency of the SLU is updated at step 706.

At step 708, the recursive method determines if this is the last word in the dictionary. If this is not the last word in the dictionary, the next word in the dictionary is selected at step 710 and that word is then broken into syllable-like units by repeating steps 702, 704 and 706.

After reaching the last word in the dictionary, the method continues at step 712 where it determines whether any of the SLUs are longer than 4 phonemes and whether the frequencies of the syllable-like units are stable. An unstable list is one that contains too many infrequent SLUs. The frequency of each syllable-like unit is determined based on a unigram probability for the word that was broken in step 702. This unigram probability for the word is derived from a corpus that utilizes the 60,000 words found in the dictionary. Each SLU that appears in the word is then given the same unigram probability. Thus, if a single SLU appears in a word twice, its frequency is updated as two times the unigram probability for the word itself.

If one of the SLUs is too long or if the frequency of the syllable-like units is unstable at step 712, the process returns to step 700 where the first word in the dictionary is again selected and again broken into even smaller syllable-like units, based on the current breaking. The process of steps 702, 704, 706, 708 and 710 are then repeated while using the updated frequencies of the syllable-like units in breaking step 702. Since the frequencies will be different with each pass through steps 700 through 712, the words in the dictionary will be broken into different and smaller syllable-like units during each pass. Eventually, however, the words will be broken into smaller pieces that provide more stable syllable-like unit frequencies.

Once the syllable-like unit frequency is stable at step 712, a language model is generated at step 714 for those generated SLUs.

Under one embodiment, the language model is formed by grouping the final set of syllable-like units of each word into n-grams. Under one embodiment, the syllable-like units are grouped into tri-grams.

After the syllable-like units have been grouped into n-grams, the total number of n-gram occurrences in the dictionary is counted. This involves counting each occurrence of each of the n-grams. Thus, if a particular n-gram appeared fifty times in the dictionary, it would contribute fifty to the count of n-gram occurrences.

Each n-gram is then counted individually to determine how many times it occurs in the dictionary. This individual n-gram count is divided by the total number of n-gram occurrences to generate a syllable-like unit language model probability for the n-gram.

Although the present invention has been described with reference to preferred embodiments, workers skilled in the art will recognize that changes may be made in form and detail without departing from the spirit and scope of the invention. In particular, although the modules of FIG. 3 have been described as existing within closed computing environment, in other embodiments, the modules are distributed across a networked computing environment.

What is claimed is:

1. A speech recognition system having a language model generated through a process comprising:
   a processor breaking each word in a dictionary into units wherein breaking each word into units comprises:
      breaking each word in the dictionary into initial units by dividing each word into the largest units possible that each include at most one vowel sound;
      for each initial unit, setting a frequency for the initial unit by summing the unigram probabilities of the words in which the initial unit was identified;
      breaking at least one of the initial units into smaller units by preferring smaller units that occur more frequently in the dictionary over smaller units that occur less frequently and by preferring smaller units that group together sequences of phonetic units that appear in a word and where each sequence of phonetic units comprises phonetic units that the speech recognition system typically fails to recognize individually;
   for each word, grouping the smaller units of the word into n-grams;
   counting the total number of n-gram occurences in the dictionary; and
   for each n-gram, counting the number of occurences of the n-gram in the dictionary and dividing this count by the total number of n-gram occurences to form a language model probability for the n-gram.

2. The speech recognition system of claim 1 wherein breaking each word further comprises updating the frequencies of the smaller units into which the word is broken.

3. The speech recognition system of claim 2 wherein the frequency of a smaller unit is calculated based on language model probabilities for words in which the smaller unit appears.

4. A method comprising:
   for each word in a dictionary of words, dividing the word into units to produce a first set of units for each word, wherein for at least one word, dividing the word into units comprises dividing the word into units smaller than the word and wherein dividing the word into units comprises dividing the word into the largest units possible that each include at most one vowel sound;
   a processor setting a frequency of each unit by summing unigram probabilities of the words in which the unit appears, wherein each unigram probability comprises the probability of the word appearing in a corpus of text;

a processor applying a constraint to the units to identify at least one unit, wherein the constraint requires that each unit have fewer than a selected number of phonemes and wherein the unit is identified because it has at least the selected number of phonemes;

for at least one word in the dictionary of words, dividing the word into units to form a second set of units by dividing into smaller units at least one unit of the first set of units for the word such that none of the words in the dictionary is divided into units that include the identified unit;

transforming the units of each word into a set of n-grams for each word; and forming a language model by determining frequency counts for each n-gram in the sets of n-grams for the words in the dictionary of words.

5. The method of claim 4 wherein the constraint comprises requiring that the unit consist of fewer than five phonemes.

* * * * *